May 20, 1969     V. H. BALLMANN     3,444,938
GROUND SOIL CORING IMPLEMENT
Filed Nov. 1, 1967
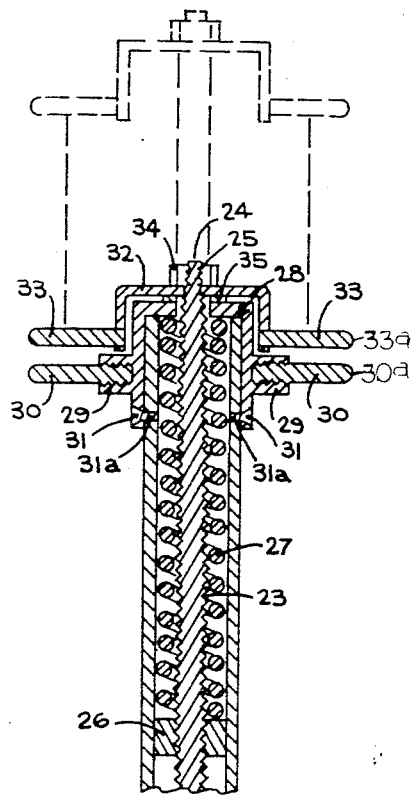
FIG. 1
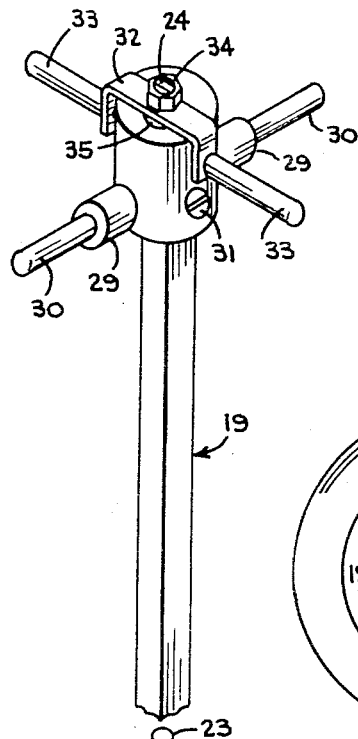
FIG. 2
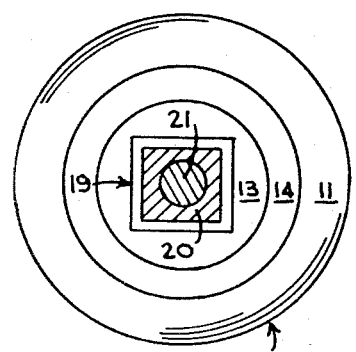
FIG. 3
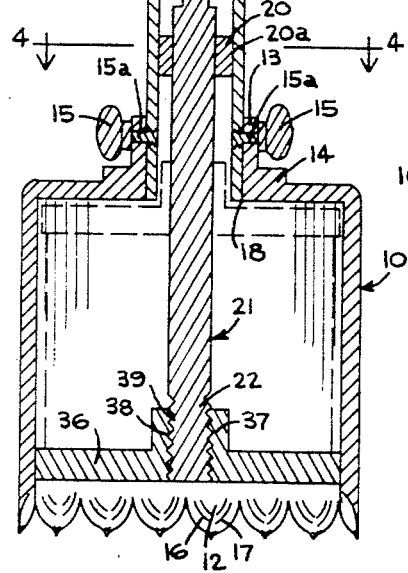
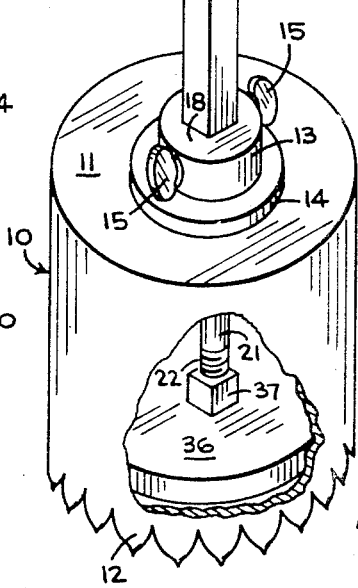
INVENTOR.
VINCENT H. BALLMANN United States Patent Office 3,444,938
Patented May 20, 1969

3,444,938
GROUND SOIL CORING IMPLEMENT
Vincent H. Ballmann, 10028 Breckenridge,
St. Ann, Mo. 63074
Filed Nov. 1, 1967, Ser. No. 679,845
Int. Cl. E21b 25/00, 3/02; G01d 21/00
U.S. Cl. 175—173                               4 Claims

ABSTRACT OF THE DISCLOSURE

The specification discloses an implement for cutting a soil core having a core ejection means. The cutter is cylindrical and has a series of teeth on the lower edge adapted to cut in either direction of rotation. The core ejection means includes a piston type plate movably fitted within the cutter and being threadedly connected to a rod having a screw threaded extent for threadedly engaging a nut within a hollow shaft detachably connected to the cutter. Spring means are provided in the space between the rod and shaft which bears upon the nut, thereby urging the plate downwardly toward cutter closing position. Separate handles are provided on the rod and shaft of the implement to provide for manual operation.

---

My invention relates to an improved ground soil cutting and excavating implement, and more in particular to an implement having a soil core rejection device. The implement being adapted to serve both gardeners and builders, as for example, the embedding of garden plants, transposing turf or sod cuttings, molds for cement footings, erection of fence posts and standards or the like.

The invention residing in a cylindrical cutting die of selective sizes having a novel soil core extrusion device.

The main object of my invention is to provide the means within a soil cutting and excavating implement whereby a soil core of substantial depth and width can be extruded from the implement substantially simultaneously following an excavating operation.

Another object of my invention resides in the means of inter-changing the selective sizes of cutting dies upon the implement without the required use of accommodating tools.

A further object of my invention is to provide a core cutting die having means to slice through embedded soil roots through selective rotation of the implement when bearing on the subsoil through a manually applied force.

A still further object of my invention is to provide an implement of the aforementioned characteristics whereby a worn die can be replaced without discarding the entire implement.

Another and important object of my invention is to provide a soil coring implement which can be readily dismantled or reassembled as may be required by general maintenance thereof.

To these and other ends my invention embodies other improvements all as will be more fully described and illustrated within the following specification and accompanying drawing, with the novel features of the invention being set forth in the appended claim.

In the drawing:
FIGURE 1 is an elevational view in vertical section embodying my invention.
FIGURE 2 is a perspective view in elevation of my invention.
FIGURE 3 is a view in transverse section taken substantially on the line 4—4 of FIG. 1, and which is illustrative of a complete plan view thereof.

Referring now to the drawing and with reference to FIG. 1 wherein I have illustrated the present preferred embodiment of my invention whereby I employ a tubular column 19 of rectangular cross section which is provided interiorly and adjacent the lower end thereof with a press fitted bushing 20 as at 20a.

Spaced from the bushing 20 and depending from the column 19 there is provided a cylindrical shell casing constituting a cutting die member 10 having an integral top closure 11 provided with a central collar 13 having a lateral flange 14 which is weldingly secured to the closure 11. Formed through the collar 13 and the closure 11 there is a rectangular opening sized complementary for slidably receiving a terminal portion of the column 19 therein for detachable engagement therewith as at 18, and which composite is secured by a pair of diametrically aligned and radially spaced thumb gripping screws 15 as at 15a. Depending from the lower marginal rim portion of the die member 10 there is provided an endless number of radially spaced teeth 12 each of which is provided with opposed spade shaped cutting edges 16 and 17, whereby slight rotative oscillation applied upon the die member 10 will effect a continuous cutting operation by the teeth 12.

The upper and free terminal end of the column 19 is provided with a handlebar 30a which comprises an inverted cup-shaped closure member 28 having a central bore formed through the planar wall thereof as at 35 which is concentrically in alignment with the bushing 20 as when the closure 28 is in telescopic relation with the column 19 served by an accommodating opening provided therein, and which composite is detachably secured by the diametrically aligned and radially spaced, pair of flat headed machine screws 31 as at 31a; furthermore, the handlebar 30a comprises a pair of laterally mounted and integral threaded pipe ferrules 29 which are radially spaced upon the peripheral wall surface of the closure member 28 and axially aligned on diametrically opposite sides thereof, and each of which is provided with a hand gripping arm member 30 threadedly secured therewith.

It now being readily apparent that my soil cutting and excavating implement can be adapted to extract soil cores from the earth of varying diameters and lengths as by the use of selective size dies, and to facilitate the extrusion of a soil core lodged within a die member I have found it expedient to use a screw actuated piston 36 adapted to provide the required force for extruding soil cores of high density from the die member, and which piston 36 normally yields resiliently when bearing on a soil core passing upwardly within a die member.

The piston 36 is sized for complementing a slidable fit with the peripheral wall surface interiorly the die member 10, and which is provided with a central and rectangular boss 37 having a central threaded bore 38 which is adapted to detachably secure the piston 36 to a terminal end portion 22 of a rod shaft 21 having a complementary screw threaded portion 39. The rod shaft 21 being disposed axially through the column 19 and slidably through both the bushing 20 and the closure bore 35 in extensible relation therewith, and formed on the rod shaft 21 and rearwardly the bushing 20 there is provided an elongated screw threaded portion 23 which threadedly carries at the intermediate lower end thereof a rectangular configurated nut 26 which complements slidably the interior perimetric confines of the column 19, and which nut 26 is adapted to serve as a means to compress a spring 27 which surrounds the rod shafts threaded portion 23 and interposes both the nut and the lower wall surface of the closure member 28 as when threaded upwardly the screw threaded portion 23 by the clockwise rotation of a second handlebar 33a.

The second handlebar 33a comprises a second pair of hand gripping arm members 33 which are spaced in superposed relation from the first pair of hand gripping arm members 33, and each of which arm members 33 being secured in axial relation at opposite sides of a flat U-shaped member 32 as is best illustrated in FIGURE 1, and which member 32 threadedly engages medially thereof with a reduced threaded terminal portion 25 of the rod shaft 21 and to preclude the possibility of the handlebar 33a from becoming loose through reverse rotation upon the rod shaft 21 there is provided a locking nut 34 which threadedly engages an extensible threaded portion 24.

Now referring to FIGURE 1 there is illustrated in phantom lines the upward slidable movement of the rod shaft 21 within the column 19 as by the manual separation of the first and second pair of handlebars 30a and 33a respectively, and which upward movement is limited by the entrance of the rectangular boss 37 within the perimetric confines interiorly the column 19 whereby it is readily apparent that through selective rotation applied upon the handlebar 33a will effect either a tightness in securing the piston 36 to the rod shaft 21 or the automatic removal therefrom whereby precluding the use of an accommodating tool as would be usual when replacing both the die 10 and the piston 36.

In operation the coring implement is brought down bearingly by the operator through the use of the handlebar 30a whereby sinking the teeth 12 within the ground soil which serves to support the implement in an up-right position while the operator transfers one hand from the handlebar 30a to one selective arm 33 of the handlebar 33a enabling him to rotate the same in counterclockwise rotation which serves to thread the nut 26 toward the lower end of the screw thread 23 whereby substantially releasing the resilient force acting on the piston 36 through the rod shaft 21 whereby the piston 36 yields to an ingressing soil core as when the operator bears down on the handlebar 30a and if embedded roots obstruct the penetration of the die within the ground soil, the operator thence applies a slight rotative oscillation upon the handlebar 30a and with slight pressure bearing thereon which serves to employ the cutting action provided by the opposed cutting edges 16 and 17 formed on the teeth 12 the roots will be readily severed and the hindrance to the sinking of the die within the ground soil will be obviated until such time as a full core has lodged within the cavity of the die, and through a slight rocking action applied upon the handlebar 30a the core within the die 10 will be separated from the soil whereby the core can be removed from the opening. I have found that in the use of my coring implement that it may be possible to remove the core from the interior of the die 10 by converging the handlebar 33a toward the handlebar 30a which serves to move the piston 36 bearingly upon the soil core as through the longitudinal movement of the rod shaft 21 for extruding the core from the die 10 if the soil within the core is substantially dry and sandy; however if the soil is plastic it then becomes necessary to employ the resilient counterforce against the soil core and which operation has been hereinbefore described.

Having thus fully described my invention what I claim as new and desire to secure by Letters Patent is:

1. In a ground soil coring implement, the combination with a cyindrical die and piston of complementary sizes movably fitted within said die, said die having a lower open end,
 (a) root cutting means provided on the rim surrounding the said lower end adapted for a continuous cutting operation on slight rotative oscillation of said die member,
 (b) a rectangular tubular column having the lower end thereof detachably secured to the closed end of said die, and in axial relation therewith for communication with the cavity provided interiorly the die,
 (c) a cylindrical closure member having a closed end provided with a central bore, said closure member adapted to telescopically engage the upper end of said column for detachable engagement therewith,
 (d) a pair of hand gripping arm members laterally mounted to the peripheral wall surface of said closure member on diametrically opposite sides thereof, constituting a handlebar,
 (e) a bushing press fitted within the said column adjacent the lower end thereof and aligned in concentric relation with the bore formed through the said closure member,
 (f) a rod shaft disposed slidably through the said bushing and the bore within the said closure member and extensible the said lower end of said column and the said closure for reciprocal movement therethrough,
 (g) said rod shaft having its lower end threadedly secured centrally the said piston in axial alignment therewith for reciprocating the said piston within the said die member,
 (h) piston releasing means to automatically drop said piston from the interior of said die member for removal of said die member from the said column,
 (i) a second pair of arm members each laterally secured to the opposite sides of a flat U-shaped member constituting a second handlebar adapted to surmount in threaded engagement with the terminal end of the said rod shaft and spaced from the first said handlebar whereby the second handlebar can be related or reciprocated through the said column while retaining the first handlebar in fixed relation relative thereto,
 (j) and resilient means acting in selective adjustment to automatically return the upward stroke of the said rod shaft within the said column for thrusting the said piston forwardly the cavity within the said die member.

2. As claimed in claim 1 wherein the root cutting means comprises an endless number of spade shaped teeth radially spaced on the marginal rim of the said die member and each provided with opposed cutting edges.

3. As claimed in claim 1 wherein the releasing means for removing the said piston from the interior of the said die member for removing the said die member from the said column, comprises a rectangular boss carried centrally the said piston and formed complementary for interfitting with the perimetric confines within the interior of said column on the upward stroke of said piston rod, whereby counterclockwise rotation applied by the second said handlebar upon the said rod shaft while retaining the first said handlebar in relatively fixed position will threadedly disengage the said rod shaft from the piston for gravitating through the opening of the said die member.

4. As claimed in claim 1 wherein the resilient means acting in selective adjustment to automatically return the upward stroke of the said rod shaft within the said column for thrusting the said piston forwardly the cavity within the said die member comprises, an elongated screw threaded portion formed with the said rod shaft having its lower end spaced from the said bushing rearwardly thereof and a rectangular nut complementing slidably the inner perimetric confines of the said column for threaded adjustment on the said screw threaded portion by selective rotation of the said second handlebar upon the said rod shaft, and said nut acting on its upward travel within the said column to compress an enlongated helical wound spring surrounding the said threaded portion and interposing the said nut and the said closure member and which tensioning acts upon the rod shaft to yieldingly resist the rearward movement of the said piston interiorly the cavity of the said die member.

References Cited

UNITED STATES PATENTS

| | | | |
|---|---|---|---|
| 370,810 | 10/1887 | Newman | 175—313 X |
| 992,120 | 5/1911 | Pope | 175—313 X |
| 2,618,500 | 11/1952 | Peach | 294—50.7 |
| 3,038,546 | 6/1962 | Blubaugh et al. | 175—313 X |
| 3,273,930 | 9/1966 | Gottfried | 175—313 X |

FOREIGN PATENTS 296,139  8/1928  Great Britain.

ERNEST R. PURSER, *Primary Examiner.*

U.S. Cl. X.R.

73—425; 175—313; 294—50.5, 50.7